(12) United States Patent
Whalen et al.

(10) Patent No.: US 11,401,991 B2
(45) Date of Patent: Aug. 2, 2022

(54) SLACK ADJUSTER MAIN SPRING HOUSING CONTAMINANT SUMP

(71) Applicant: Westinghouse Air Brake Technologies Corporation, Wilmerding, PA (US)

(72) Inventors: Shaun T. Whalen, Chicago, IL (US); Peter Paul Gregar, Greenville, SC (US); Scott Lee Natschke, Bourbonnais, IL (US)

(73) Assignee: WESTINGHOUSE AIR BRAKE TECHNOLOGIES CORPORATION, Wilmerding, PA (US)

( * ) Notice: Subject to any disclaimer, the term of this patent is extended or adjusted under 35 U.S.C. 154(b) by 0 days.

(21) Appl. No.: 17/158,563

(22) Filed: Jan. 26, 2021

(65) Prior Publication Data

US 2021/0148426 A1    May 20, 2021

Related U.S. Application Data

(63) Continuation of application No. 16/449,970, filed on Jun. 24, 2019, now Pat. No. 10,948,038, which is a continuation of application No. 14/982,445, filed on Dec. 29, 2015, now Pat. No. 10,330,162.

(60) Provisional application No. 62/097,879, filed on Dec. 30, 2014.

(51) Int. Cl.
| | |
|---|---|
| *F16D 65/66* | (2006.01) |
| *B61H 15/00* | (2006.01) |
| *F16D 65/56* | (2006.01) |

(52) U.S. Cl.
CPC ......... *F16D 65/66* (2013.01); *B61H 15/0057* (2013.01); *F16D 65/56* (2013.01)

(58) Field of Classification Search
CPC ...... F16D 65/0025; F16D 65/38; F16D 65/56; F16D 65/66; B61H 15/00; B61H 15/0028; B61H 15/0057
See application file for complete search history.

(56) References Cited

U.S. PATENT DOCUMENTS

| | | |
|---|---|---|
| 4,499,978 A | 2/1985 | Norcross |
| 5,615,755 A | 4/1997 | Karlsson |
| | (Continued) | |

FOREIGN PATENT DOCUMENTS

KR    10-2880-0054613 A    6/2008

OTHER PUBLICATIONS

Examination Report for corresponding CA Application No. 2,972,446 dated Mar. 17, 2022 (3 pages).

*Primary Examiner* — Thomas W Irvin
(74) *Attorney, Agent, or Firm* — The Small Patent Law Group LLC; Mary D. Lawlor

(57) ABSTRACT

A drainage system for use with a slack adjuster for a railway brake rigging wherein the slack adjuster includes a main spring housing, a cone nut housing enclosing a critical operating area of the slack adjuster, and an over travel housing. The drainage system includes at least one opening extending through a sidewall portion of the main spring housing. The opening is configured to allow fluid and/or contaminates to drain therethrough to reduce exposure of the critical operating area of the slack adjuster to the fluid and/or contaminants. A seal/splash guard can be provided at the intersection of the main spring housing and the cone nut housing to prevent fluid and contaminants from entering into the cone nut housing.

20 Claims, 13 Drawing Sheets

(56) References Cited

U.S. PATENT DOCUMENTS

| | | | |
|---|---|---|---|
| 7,802,662 B2* | 9/2010 | Sommerfeld | F16D 65/56 188/197 |
| 9,272,718 B2* | 3/2016 | Huber, Jr. | B61H 15/0028 |
| 9,327,739 B2* | 5/2016 | Huber, Jr. | F16D 49/08 |
| 9,540,021 B2* | 1/2017 | Whalen | F16D 65/0025 |
| 2009/0065312 A1 | 3/2009 | Sommerfeld et al. | |
| 2010/0320044 A1 | 12/2010 | Emilsson | |
| 2014/0353095 A1* | 12/2014 | Huber, Jr. | B61H 15/0028 188/199 |
| 2015/0001016 A1* | 1/2015 | Whalen | B61H 15/0057 188/202 |
| 2016/0075353 A1* | 3/2016 | Huber, Jr. | F16D 65/10 188/202 |

\* cited by examiner

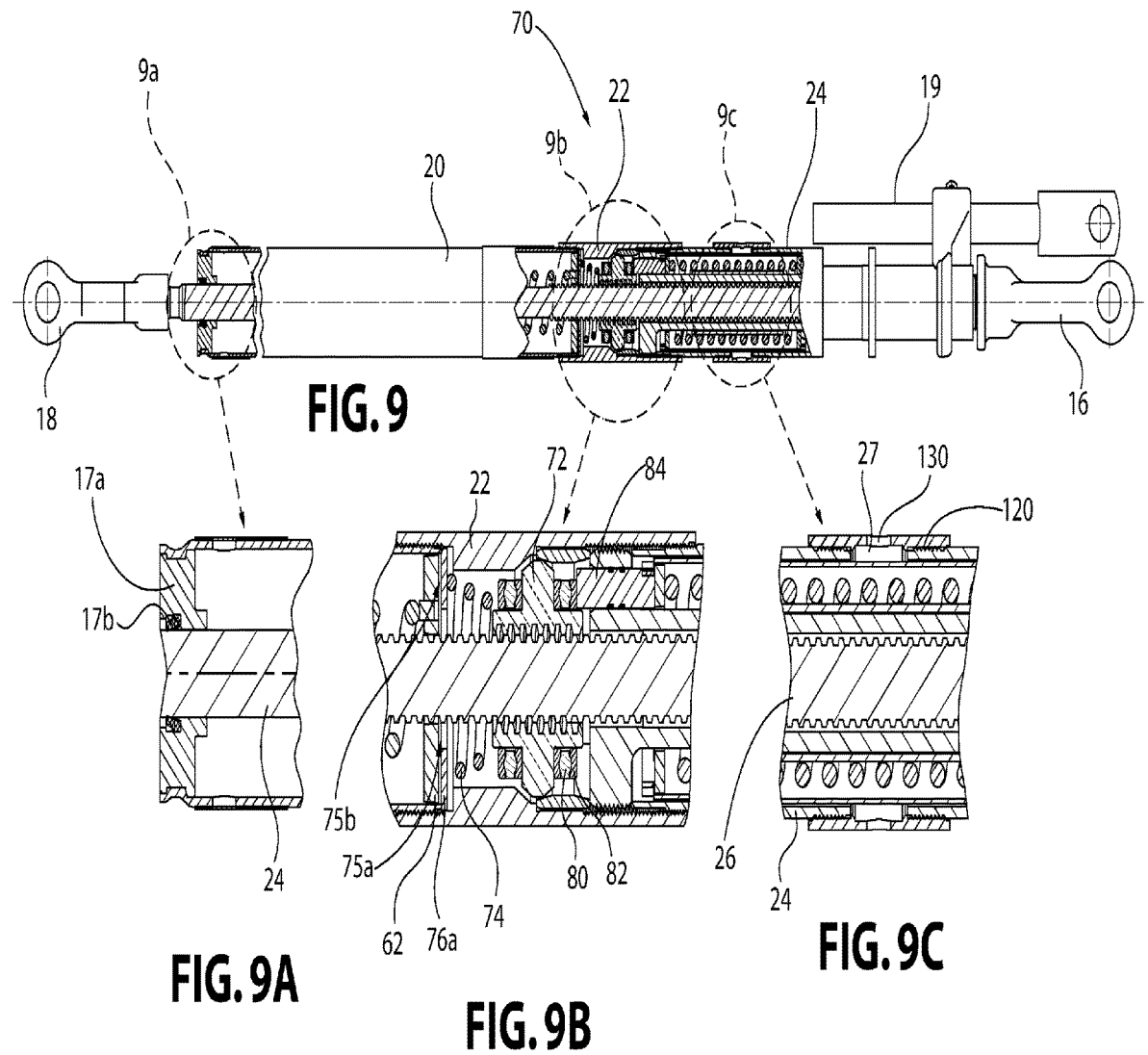

SLACK ADJUSTER MAIN SPRING HOUSING CONTAMINANT SUMP

CROSS-REFERENCE TO RELATED APPLICATIONS

This application is a continuation of U.S. application Ser. No. 16/449,970, filed on 24 Jun. 2019, which is a continuation of U.S. application Ser. No. 14/982,445, filed 29 Dec. 2015 (now U.S. Pat. No. 10,330,162), which claims priority to provisional U.S. Application No. 62/097,879, filed 30 Dec. 2014, the entire disclosures of which are incorporated herein by reference.

FIELD

The present disclosure is directed to a slack adjuster which automatically adjusts the slack in the brake rigging of a railway vehicle, and further, particularly, to a slack adjuster including a drainage system in an area located within the main spring housing in which water and other contaminants will pool, move towards, or follow the path of the least resistance thereto and accumulate therein and through which the fluid can subsequently drain out of the main spring housing of the slack adjuster.

BACKGROUND

Slack adjuster assemblies have been employed in brake riggings to compensate for slack caused by wear induced in the brake pads, wheels, and other components in brake rigging during repeated braking applications. By controlling this slack, the brake piston travel is automatically maintained at the correct length to ensure maximum efficiency in the brake system. The slack adjuster is also used to automatically adjust the slack in the brake rigging for various other reasons. One reason is to maintain the brake cylinder piston rod travel distance within a prescribed limit, which is of particular importance in present day higher speed operations. In addition, today's railway vehicles have a greater number of cars due to better locomotive equipment. For these reasons, it is important that the piston rod travel of the brake cylinder be maintained at a relatively close tolerance in order to properly balance the fluid pressure, usually air, in the fluid cylinder with that in the reservoir. Another important reason is that the slack adjusters will provide a substantially more uniform braking force to be applied to each set of wheels on each car making up a train.

One example of a slack adjuster that is used in a wide variety of railway applications is a double-acting compression-type slack adjuster, which is described in U.S. Pat. No. 4,662,485 and incorporated herein by reference. This slack adjuster assembly includes an elongated hollow housing member restrained against rotation and pivotally connectable at a first end thereof to a brake rigging. An elongated rod member, which is restrained against rotation and pivotally connectable at a first end thereof to the brake rigging, is provided within this housing and has at least a threaded portion adjacent a second end thereof. The threaded portion of the rod member extends into and is reciprocally movable within the housing through a second end of the housing. A positioning means, such as a cone lock nut located within a cone nut housing portion, movable between respective first abutting engagement, disengagement, and second abutting engagement positions, is threadably engaged with the threaded portion of the rod member intermediate said ends thereof. The cone lock nut rotates about the threaded portion of the rod member when in the disengaged position thereby changing the length of the slack adjuster assembly by changing the relative longitudinal position between the housing and the rod member. A pair of opposite facing abutment surfaces positioned within a portion of the housing and a pair of opposed abutting surfaces carried by the cone lock nut are provided for engaging respective adjacent surfaces to resist rotation of the cone lock nut about the rod member when the cone lock nut is in one of the respective abutting engagement positions thereby retarding the change in relative longitudinal position between the housing and the rod member are provided. A first urging means is positioned between the cone lock nut and an abutment surface carried by the rod member for urging the cone lock nut into the disengaged position. A second urging means is positioned between the first end of the housing and the cone lock nut for overcoming a force applied by the first urging means and for urging the cone lock nut into the first abutting relationship position. An over travel control means located within an over travel control housing is positioned to reciprocally move in a longitudinal direction adjacent the first end of the housing and is engageable with the second urging means for reducing the force applied by the second urging means to less than the force applied by the first urging means, thereby allowing the cone lock nut to move to the disengaged position. An over travel control actuating means is positioned to engage the over travel control means for actuating the over travel control means in response to the travel distance of a brake cylinder piston connected to the brake rigging.

Other examples of slack adjusters include the Universal Model 2300-DJ, owned by the Assignee of the present disclosure, Ellcon National Model D-2000, and New York Air Brake Model KDR-482-E.

During use of the brake rigging, the slack adjuster is exposed to various environmental conditions, including conditions where the slack adjuster is exposed to large amounts of fluid, such as water. This water and other contaminants from the environment can accumulate and become trapped within the slack adjuster in the main spring housing or even in the critical operating area and near critical components of the slack adjuster, which can compromise the functioning of the slack adjuster. In one example, such as in the Universal Model 2300-DJ, the critical operating area includes the cone nut, bearing race assembly, and the conical spring, all of which operate together to allow the slack adjuster to adjust the brake rigging of the railcars as needed. It can be appreciated that different slack adjuster designs may include additional and/or other components within the critical operating area.

Some slack adjuster designs include a seal, such as a wiper seal, installed at the end cap of the main spring housing wherein the slack adjuster rod moves in and out. This seal is provided with the intended purpose of preventing water and contaminants from entering into the slack adjuster. However, when a slack adjuster is exposed to large amounts of water, this wiper seal can fail to block all of the water from entering into the main spring housing and, subsequently, the critical operating area of the slack adjuster. Thus, in these instances, water and contaminates may enter into the main spring housing and then into the critical operating area and deleteriously effect the components located therein, resulting in faulty operation of the slack adjuster. Accordingly, there is a need in the art to provide an accumulation point and a drainage point in the main spring housing for all miscellaneous water and contaminants that breach this wiper seal. Providing this accumulation and drainage point will maintain optimal operation of the critical operating components of the slack adjuster by preventing accumulation of water and contaminants near the critical areas of the slack adjuster. The system for preventing this accumulation of water and protecting the critical operating area from contaminants must be adaptable to all slack adjusters and orientations of installation, such that the slack adjuster can be used in a wide array of environmental conditions.

BRIEF DESCRIPTION

In accordance with an embodiment of the present disclosure, a drainage system is provided for use with a slack adjuster for a railway brake rigging. The drainage system allows fluid, such as water and other contaminants, such as dirt and debris, to drain from the slack adjuster to prevent the fluid and contaminants from accumulating within the slack adjuster, contacting an operating area or a critical operating area of the slack adjuster, and interfering with the operation of the slack adjuster. The slack adjuster includes a main spring housing, a cone nut housing enclosing a critical operating area of the slack adjuster comprising components configured to operate together to adjust the brake rigging, and an over travel housing. The drainage system includes at least one opening extending through a sidewall portion of the main spring housing. According to one embodiment, the at least one opening can comprise at least one aperture extending through the sidewall portion of the main spring housing. The at least one opening is configured to allow fluid and/or contaminates to drain through this at least one opening to reduce exposure of the critical operating area of the slack adjuster to the fluid and/or contaminants.

The critical operating area includes components configured to operate together to adjust the brake rigging. According to one design, the critical operating area can include a cone nut, at least one bearing race assembly, and a conical spring, all of which are configured to cooperate together to change a length of the slack adjuster by changing a relative longitudinal position between the main housing portion and a rod member located within the main housing portion. It can be appreciated that other slack adjuster designs can include different components within this critical operating area which cooperate together to operate the slack adjuster. The drainage system of the disclosure can be utilized to drain fluid and/or contaminants from the slack adjuster and prevent these fluids and/or contaminants from interfering with the operation of the slack adjuster.

In embodiments where the opening comprises at least one aperture extending through the sidewall of the main spring housing, at least one of a plug, a one-way valve, and a patch can be provided which is configured for cooperating with the at least one aperture. It can be appreciated that the plug can be a standard plug that is shaped to sealingly engage the aperture. According to one embodiment, the plug can comprise a rounded, low-profile plug extending through the at least one aperture. The patch or rounded, low-profile plug provides advantages in terms of stacking and shipping of the slack adjusters and has less of a chance of being damaged or broken during shipping and/or use of the slack adjuster.

The at least one opening can comprise multiple openings or apertures located about and extending through the sidewall portion of the main spring housing and each of the apertures can include at least one of a plug, a one-way valve, a sealant, and a patch configured for cooperating with each of the apertures. The plug, patch, or sealant can be removable from the aperture. In some arrangements, the plug or one-way valve that is facing in the most downwardly direction can be removed after installation of the slack adjuster to facilitate drainage of fluid and/or contaminants through the bottom aperture. It can be appreciated that the plug can be formed from any well-known material or can have a removable cover formed from any known material. Also, the plug and/or cover can have various designs, such as a threaded bolt arrangement, tape, shrink wrap, and the like.

According to one embodiment, the drainage system can also include a plug housing configured to encompass at least a portion of the main spring housing, said plug housing including at least one aperture extending through a sidewall portion in alignment with the at least one opening extending through the sidewall portion of the main spring housing. The plug housing can include threads for threadedly engaging a threaded portion of the main spring housing. The at least one opening extending through the sidewall of the main spring housing can comprise multiple apertures and the at least one aperture extending through the sidewall of the plug housing can comprise multiple apertures aligned with one another, and wherein each of the aligned apertures include at least one of a plug, a one-way valve, a patch, or a sealant cooperating with the aligned apertures. The plug, patch, or sealant sealing or covering the downwardly facing apertures can be removable to allow for fluid and/or contaminants to drain from the slack adjuster.

The main spring housing can have a shape configured to cause any fluid and/or contaminates trapped within the slack adjuster to flow into and accumulate within the main spring housing. Designing the main spring housing in this manner facilitates drainage and/or removal of the trapped fluid and contaminants out of the slack adjuster. According to one embodiment, the main spring housing, including the at least one aperture, can be a one-piece formed member.

According to yet another embodiment, the drainage system can include a second drainage system comprising at least one aperture extending through a sidewall portion of the over travel housing.

One example of a slack adjuster that can include the drainage system of the disclosure is a double-acting tension actuatable slack adjuster. The double-acting tension actuatable slack adjuster includes an elongated hollow cylindrical housing member which is restrained against rotation and pivotally connectable at a first end thereof. The elongated hollow cylindrical housing includes a main housing, a cone nut housing, and an over travel housing. An elongated rod member is provided, which is restrained against rotation and pivotally connectable at a first end thereof. The rod member has at least a portion thereof threaded, which extends into the housing member through a second end of the housing member. A cone lock nut is threadedly engaged with the threaded portion of the rod member intermediate a first and second end thereof. The cone lock nut is axially movable for rotating about the threaded portion of the rod member to change the length of the slack adjuster by changing the relative longitudinal position between the housing member and the rod member. The cone lock nut is located within the cone nut housing. The slack adjuster also includes at least a first spring for urging the cone lock nut into a first position with respect to the housing member and a second spring for overcoming a force applied by the first spring and for urging the cone lock nut into a second position. At least one drainage system is associated with the main housing for allowing fluid and/or contaminants to drain out of the slack adjuster.

The at least one drainage system can include an opening extending through a sidewall portion of the main housing. The at least one opening is configured to allow fluid and/or contaminants to drain therethrough to reduce exposure of the critical operating area to fluid and/or contaminants. According to one embodiment, the at least one opening can be one or more apertures extending through the sidewall portion of the main housing. At least one of a patch, a plug, a sealant or a one-way valve can be provided, which is configured for cooperating with the at least one aperture. A plug housing can be provided, which encompasses a portion of the main spring housing. This plug housing includes at least one aperture in alignment with the opening extending through the sidewall portion of the main spring housing. According to another embodiment, the main housing can be two separate members positioned with respect to each other such that an opening exists between the two members. The plug housing encompasses the separate members and the opening between the members. The slack adjuster can include a second drainage system for allowing fluid and/or contaminants to drain out of the slack adjuster. This second drainage system can be associated with the over travel housing.

In accordance with another embodiment, a method is provided for preventing the accumulation of water and/or contaminants within a slack adjuster and for protecting a critical operating area of the slack adjuster. The slack adjuster includes a main housing, a cone nut housing enclosing the critical operating area of the slack adjuster, and an over travel housing. The method comprises providing at least a first drainage system comprising at least one opening extending through a sidewall portion of the main spring housing. The at least one opening is configured to allow fluid and/or contaminants to drain through this at least one opening to reduce exposure of the critical operating area to fluid and/or contaminants. The method further includes applying at least one of a plug, a patch, a sealant, and a one-way valve to the at least one opening. According to one embodiment, a plurality of openings can be provided in the form of apertures, located about and extending through the sidewall portion of the main spring housing and the method comprises removing at least one of the plugs, patches, and sealant material cooperating with the downwardly facing apertures to allow fluid and/or contaminants to drain from the slack adjuster.

According to one embodiment, the main spring housing that includes the at least one aperture, can be formed as a one-piece member. According to another embodiment, a plug housing can be provided that includes at least one aperture extending through a sidewall thereof and the method includes positioning the plug housing about a portion of the main spring housing, such that the at least one aperture in the plug housing is aligned with the at least one opening extending through the sidewall portion of the main spring housing. According to yet another embodiment, the main spring housing can be two separate members having an open portion or gap therebetween and the plug housing encompasses the opening/gap and facing end portions of the two members of the main spring housing. The method can also include providing a second drainage system for allowing fluid and/or contaminants to drain out of the slack adjuster wherein this second drainage system is associated with the over travel housing.

According to still another embodiment, a slack adjuster for a railway brake rigging includes a main spring housing, a cone nut housing enclosing a critical operating area of the slack adjuster comprising components configured to operate together to adjust the brake rigging, and an over travel housing. The slack adjuster includes a seal/splash guard located at an intersection of the main spring housing and the cone nut housing to reduce exposure of the critical operating area of the slack adjuster to the fluid and/or contaminants. The seal/splash guard comprises a rubberized washer having rubber material located at an inner diameter and an outer diameter of the washer. During assembly of the main spring housing and the cone nut housing, the rubber material is compressed between the interfaces of the housings such that the rubber material fills in any open areas, sealing the area from any water intrusion from either the threads or from contaminants going over or under the washer outer diameter. The rubber material on the inner diameter acts as a guard against splashing or rolling water from entering through the central opening of the washer. The slack adjuster can also include at least one opening extending through a sidewall portion of the main spring housing. The at least one opening is configured to allow fluid and/or contaminates to drain therethrough. The at least one opening and the seal/splash guard cooperate together to reduce exposure of the critical operating area of the slack adjuster to the fluid and/or contaminants.

BRIEF DESCRIPTION OF THE DRAWINGS

Reference is now made briefly to the accompanying drawings, in which:

FIG. 9 is a partial cross-sectional view of the slack adjuster of FIG. 1, showing a critical operating area of the slack adjuster in accordance with the embodiment shown in FIG. 8 of the present disclosure;

FIG. 9A is a detailed area view labeled "9a" in FIG. 9 in accordance with an embodiment of the present disclosure;

FIG. 9B is a detailed area view labeled "9b" in FIG. 9 in accordance with an embodiment of the present disclosure;

FIG. 9C is a detailed area view labeled "9c" in FIG. 9' in accordance with an embodiment of the present disclosure;

DETAILED DESCRIPTION

Figure 1:
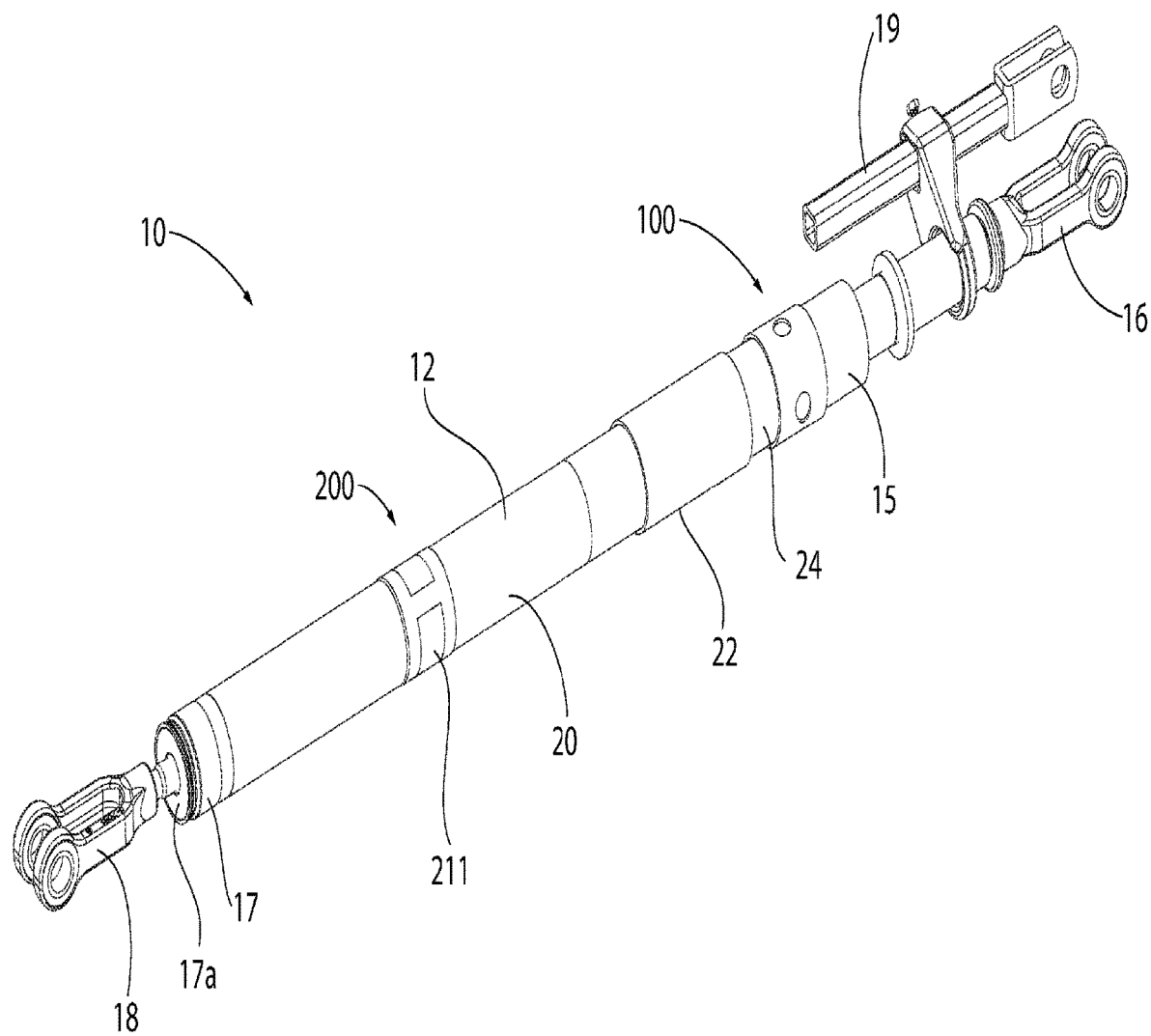
FIG. 1 is a perspective view of a double acting automatic slack adjuster for use with a railway brake rigging including a drainage system in accordance with an embodiment of the present disclosure.

For purposes of the description hereinafter, the terms "upper", "lower", "right", "left", "vertical", "horizontal", "top", "bottom", "lateral", "longitudinal", and derivatives thereof, shall relate to the disclosure as it is oriented in the drawing figures. However, it is to be understood that the disclosure may assume various alternative variations, except where expressly specified to the contrary. It is also to be understood that the specific devices illustrated in the attached drawings, and described in the following specification, are simply exemplary embodiments of the disclosure. Hence, specific dimensions and other physical characteristics related to the embodiments disclosed herein are not to be considered as limiting.

Figure 2:
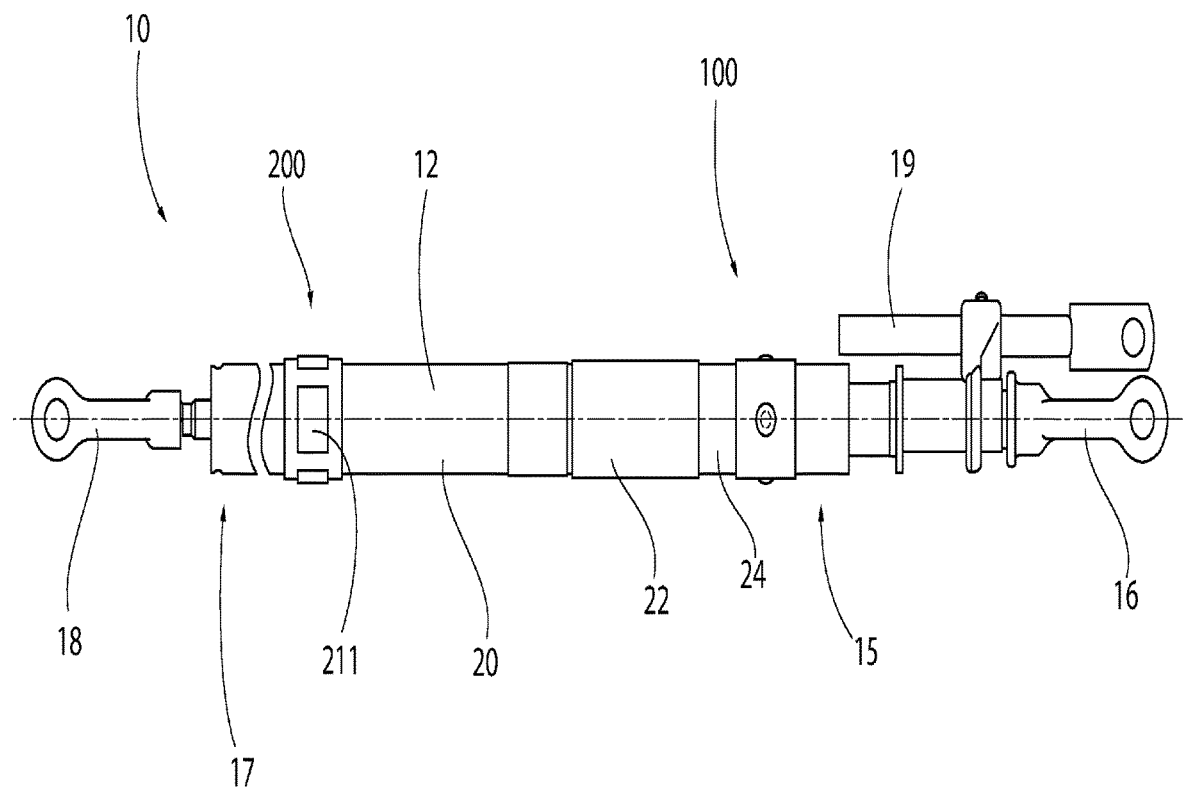
FIG. 2 is a side elevation view of the double acting automatic slack adjuster of FIG. 1, including the drainage system in accordance with an embodiment of the present disclosure.
Figure 3:
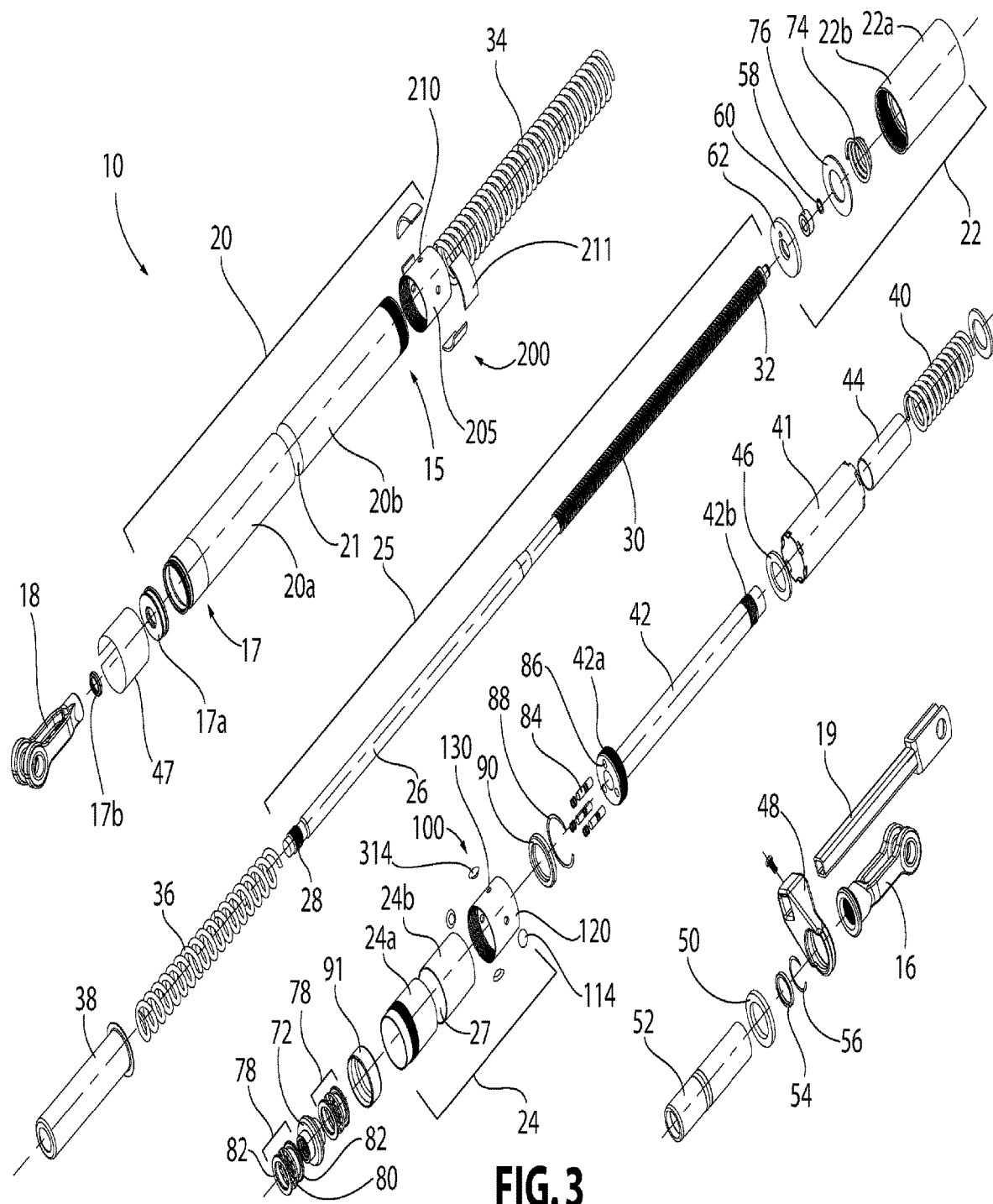
FIG. 3 is an expanded perspective view of the slack adjuster of FIG. 1, including the drainage system in accordance with an embodiment of the present disclosure.

Reference is now made to FIGS. 1-3 which show a double-acting slack adjuster, generally indicated as 10, for use in a railway vehicle brake linkage, not shown, to automatically adjust the slack within the brake linkage caused by wear induced in the brake pads, wheels, and other components in the brake rigging during repeated braking applications. The slack adjuster includes a drainage system, generally indicated as 200, configured to allow fluid and/or contaminates to drain out of the main spring housing 20 of the slack adjuster 10 to reduce exposure of the critical operating area, generally indicated as 70 in FIG. 3A, to fluid and/or contaminants. The slack adjuster critical operating area 70 is defined in detail below, but generally refers to the area including the components which operate together to adjust the brake rigging of the railcars as needed.

With continuing reference to FIGS. 1-3, the slack adjuster 10 includes an elongated hollow cylindrical housing member 12 which is restrained against rotation and pivotally connectable at a first end, generally indicated as 15 thereof, to the brake rigging with a front jaw 16 and pivotally connectable at a second end, generally indicated as 17 thereof, to the brake rigging with a rear jaw 18. The second end 17 of the housing member 12 includes a cap 17a and a wiper seal 17b, shown in FIG. 3. The first end 15 of the housing member 12 also includes a control rod 19. The elongated cylindrical housing member 12 includes a main spring housing portion 20, a cone nut housing portion 22, and an over travel housing portion 24. With particular reference to FIG. 3, the slack adjuster 10 also includes a rod assembly 25 including an elongated rod member 26 positioned for reciprocal movement within the housing member 12 through the second end 17 of the housing member 12. The rod member 26 is restrained against rotation and pivotally connectable at a first end 28 thereof to the railway brake rigging by the rear jaw 18. The rod member has a threaded portion 30 adjacent a second end 32 that extends into the housing member 12 and through the first end 15 of the housing member 12. The housing member 20 can also include a decal or identification label 47, as shown in FIG. 3.

Figure 3A:
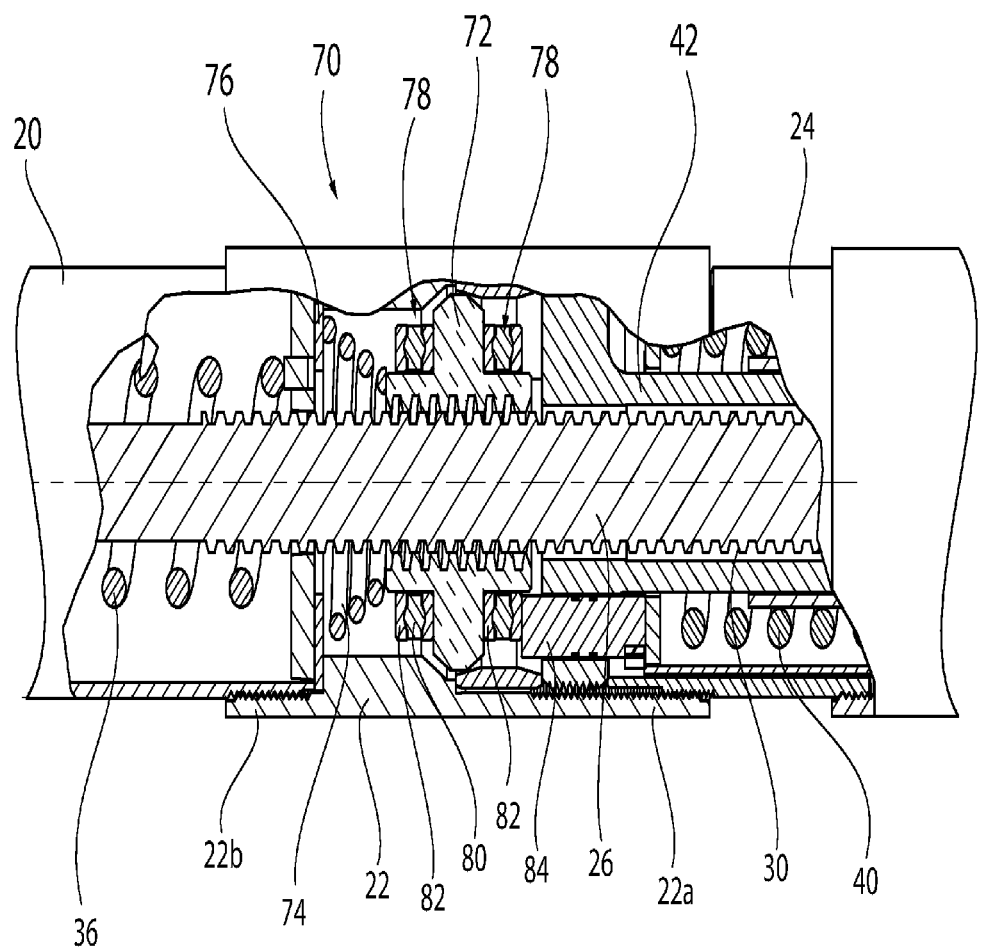
FIG. 3A is a partial cross-sectional view of the slack adjuster of FIG. 1, showing a critical operating area of the slack adjuster in accordance with an embodiment of the present disclosure.

With continuing reference to FIGS. 1-3, and with reference to FIG. 3A, the slack adjuster 10 includes a critical operating area 70. This critical operating area 70 includes the components of the slack adjuster 10 which operate together to adjust the brake rigging. One example of a critical operating area is shown in FIGS. 3 and 3A, and includes a positioning member, such as a cone lock nut 72 that is located within the cone nut housing portion 22, and threadedly engaged with the threaded portion 30 of the elongated rod 26. The cone lock nut 72 rotates about the threaded portion 30 of the elongated rod 26 between respective first abutting engagement, disengagement, and second abutting engagement positions to change the length of the slack adjuster 10 by changing the relative longitudinal positions between the housing member 12 and the elongated rod 26.

The slack adjuster 10 also includes a first urging assembly which can include at least one main or first spring 34, an additional spring 36 located within a spring cup 38, and a conical spring 74, located within the critical operating area 70 for urging the cone lock nut 72 into a first position, such as a disengaged position, with respect to the housing member 12. The conical spring 74 can be caged between the cone lock nut 72 and a conical spring seat 76. It can be appreciated that the springs 34, 36 can be replaced with other types of urging members, such as pneumatic or hydraulic cylinders.

A second urging assembly is also provided which, according to one embodiment, can include a second spring or over travel spring 40 located within an over travel spring housing 41. The over travel spring 40 is stronger than the first or main spring 34 so as to overcome the force applied by the first or main spring 34 and, therefore, urge the cone lock nut 72 into a second position. It can also be appreciated that, like the first urging assembly, a fluid operated cylinder, such as a pneumatic or hydraulic cylinder may be used in place of the over travel spring 40.

The over travel housing portion 24 can also include a rod guide 42 threaded at a first end 42a and a second end 42b and configured for cooperating with the elongated rod 26 and over travel spring 40. An over travel sleeve 44 can be provided between at least a portion of the rod guide 42 and the over travel spring 40. One or more washers 46 can be provided within the over travel housing portion 24.

Other components located at the front end of the slack adjuster 10 include an over travel sliding collar 48, an over travel control ring swaging 50, and a machined tube 52. A wiper seal 54 and a retaining ring 56 may also be provided at this front end. A wiper seal 90 may also be provided in the over travel housing assembly 24. As discussed above, a wiper seal 17b is provided at the back end or the back entrance near the seal cap 17a of the main spring housing 20. Prior to the present disclosure, previous slack adjuster designs relied upon these wiper seals to prevent water and contaminants from entering into the slack adjuster 10 and into the critical operating area 70. However, in situations where the slack adjuster is exposed to a large amount of water, these wiper seals may be insufficient to prevent the entrance of water and/or contaminants from entering into the critical operating area 70 of the slack adjuster 10 and causing operational problems with the components located therein which operate together to adjust the brake rigging of the railcar. These operational problems could occur if dirt or other foreign objects become trapped between the moving parts of the components or if any accumulated water surrounding the components freezes, which would inhibit and/or otherwise prevent the normal movement of the components with respect to one another.

Referring, in particular, to FIGS. 3 and 3A, in addition to the cone lock nut 72, conical spring 74, and conical spring seat 76, the critical operating area 70 includes bearing assemblies, generally indicated as 78, including a bearing 80 cooperating with race 82, which are located on both sides of the cone lock nut 72. Also included in the critical operating area 70 is one or more trigger pins 84 located within apertures 86 extending into the first end 42a of the rod guide 42, a retaining ring 88, the wiper seal or over travel housing portion seal 90, and a front cone 91.

In operation, the cone lock nut 72, the bearing assemblies 78, and the conical spring 74 cooperate together to change a length of the slack adjuster 10 by changing a relative longitudinal position between the main spring housing portion 20 and the elongated rod 26 located within the main spring housing portion. The cone nut housing portion 22 is positioned between the over travel housing portion 24 and the main spring housing portion 20. The cone nut housing portion 22 includes a first end 22a positioned adjacent to the over travel housing portion 24 and a second end 22b positioned adjacent to the main spring housing portion 20. As shown in FIG. 3, the cone nut housing portion 22 can include a retaining ring 58, a collet 60, and a washer 62. The first end 22a and the second end 22b can also include threads that are configured to cooperate with threads on the main spring housing portion 20 and the over travel housing portion 24.

The present disclosure is directed to a drainage system, generally indicated as 200, associated with the main spring housing portion 20. The drainage system 200 allows fluid, such as water, and other contaminants, such as dirt and/or debris, which pools/accumulates or follows the path of least resistance into the main spring housing 20, to drain out of the slack adjuster 10 and to prevent this fluid and/or contaminants from contacting the critical operating area 70 of the slack adjuster 10. Specifically, the disclosure provides an area for the accumulation and drainage of water, miscellaneous debris, and other contaminants to prevent accumulation and distribution of this material inside the slack adjuster 10. The present disclosure also provides a drainage point for miscellaneous contaminants that breach the wiper seal 17b, discussed in detail above. The presence of water and/or debris in the critical operating area 70 can interfere with the operation of the slack adjuster 10.

Figure 4A:
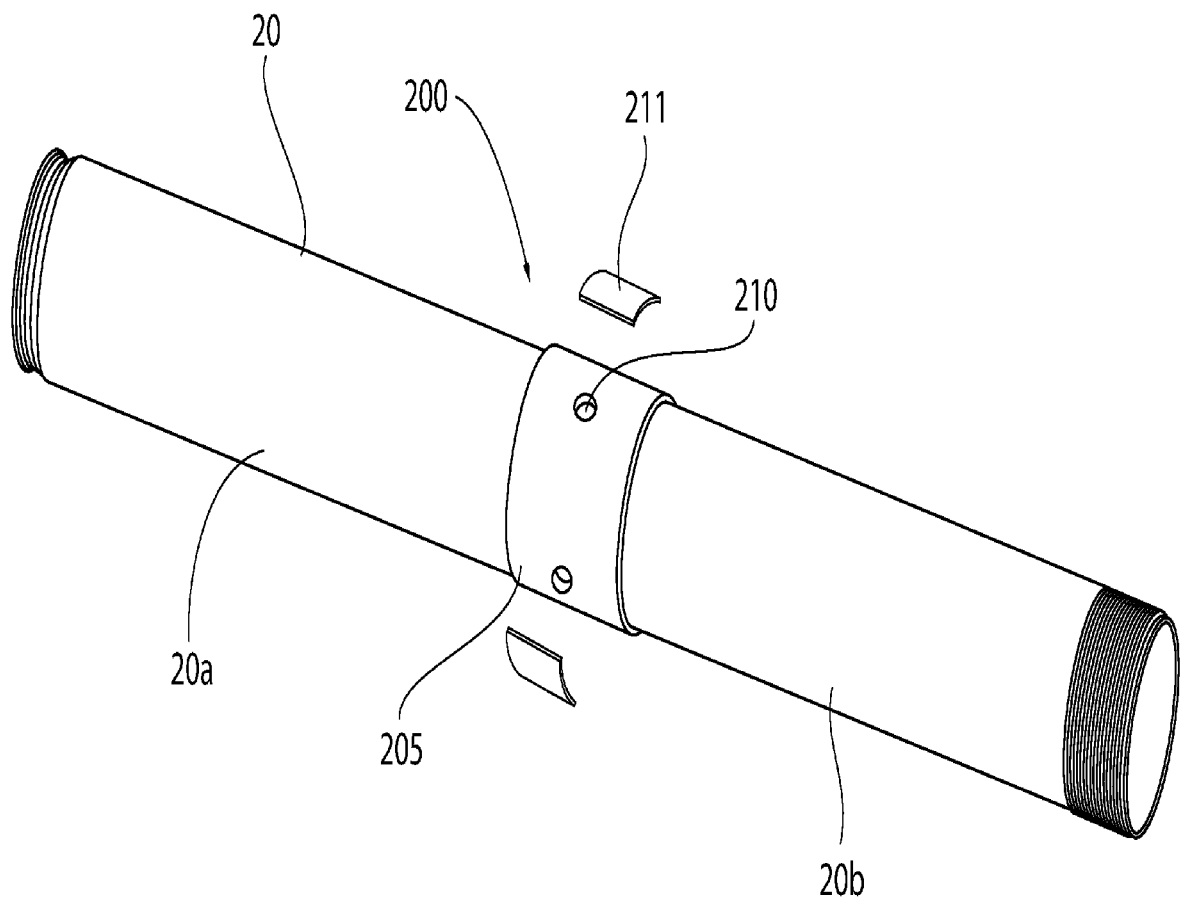
FIG. 4A is a perspective view of the main spring housing including a draining device for use with the drainage system in accordance with an embodiment of the present disclosure.
Figure 4B:
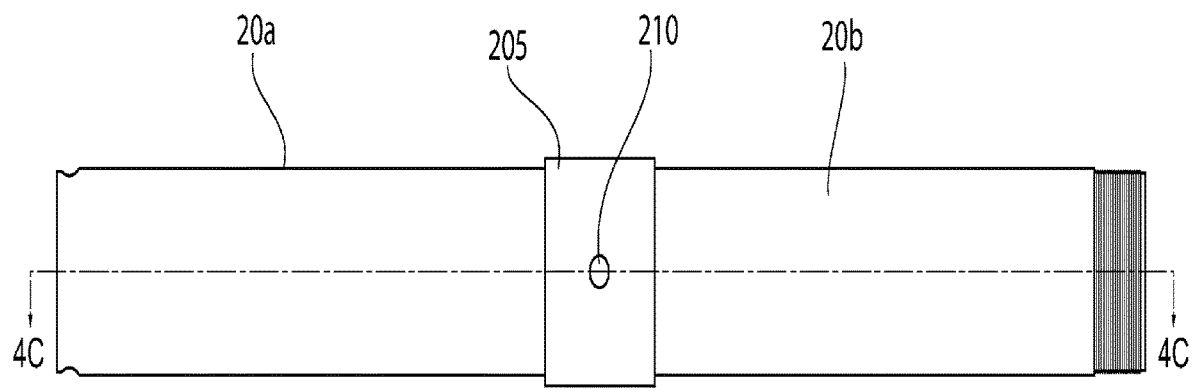
FIG. 4B is a side elevation view of the main spring housing of FIG. 4A in accordance with an embodiment of the present disclosure.
Figure 4C:
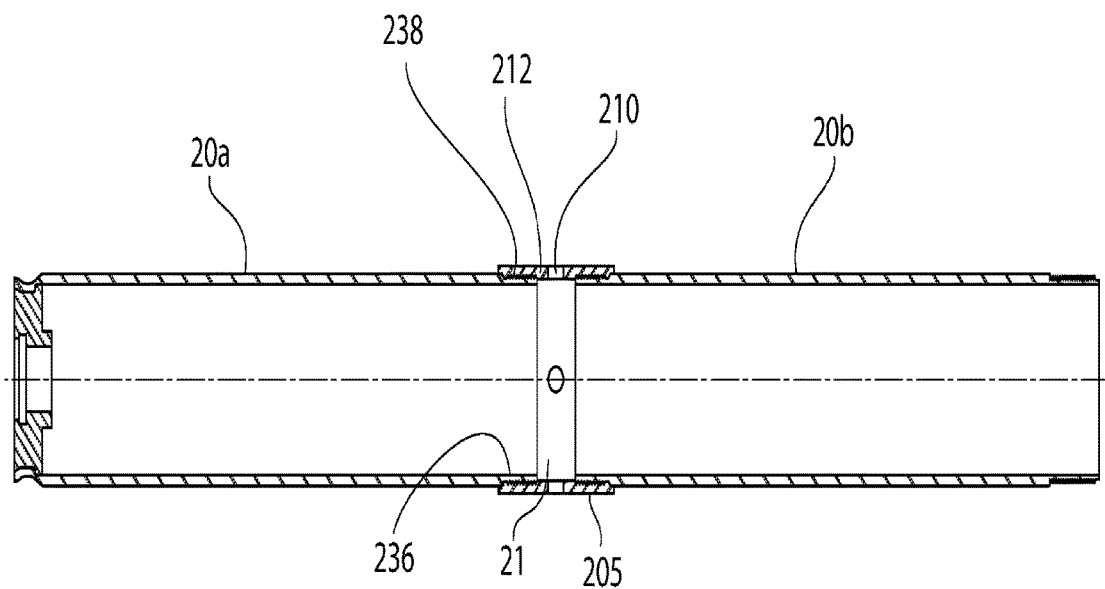
FIG. 4C is a cross-sectional view of the main spring housing taken along line 4C-4C of FIG. 4B in accordance with an embodiment of the present disclosure.

Reference is now made to FIGS. 4A-4C which show the drainage system 200 in accordance with an embodiment of the disclosure. The drainage system 200 includes a plug housing 205 which is fitted about the main spring housing 20. As shown in FIG. 4C, the plug housing 205 can have threads 236 located at opposing ends thereof. The main spring housing 20 can be split into two separate members 20a, 20b which are associated with one another by the plug housing 205 so as to provide an opening or gap 21 located therebetween. According to one embodiment, threads 238 can be provided on the facing end portions of separate members 20a, 20b of the main spring housing 20 which can be threadedly secured to the threads 236 of the plug housing 205. It can be appreciated that the drainage system 200 of the present disclosure can be used with new slack adjuster systems or can be retrofitted to existing slack adjuster systems by modification of the main spring housing 20. According to another embodiment, the main spring housing 20 can be modified to be a one-piece member including an opening therein.

Figure 5A:
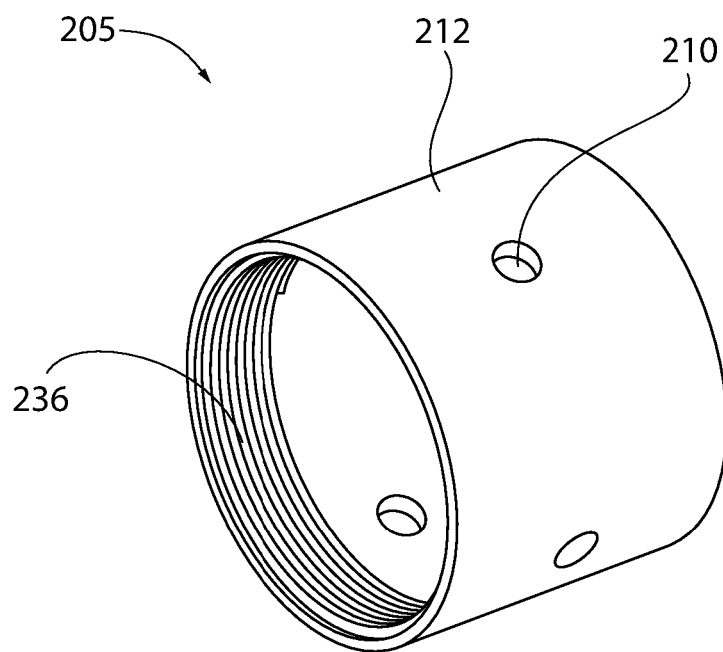
FIG. 5A is a perspective view of a plug housing for use with the drainage system in accordance with an embodiment of the present disclosure.
Figure 5B:
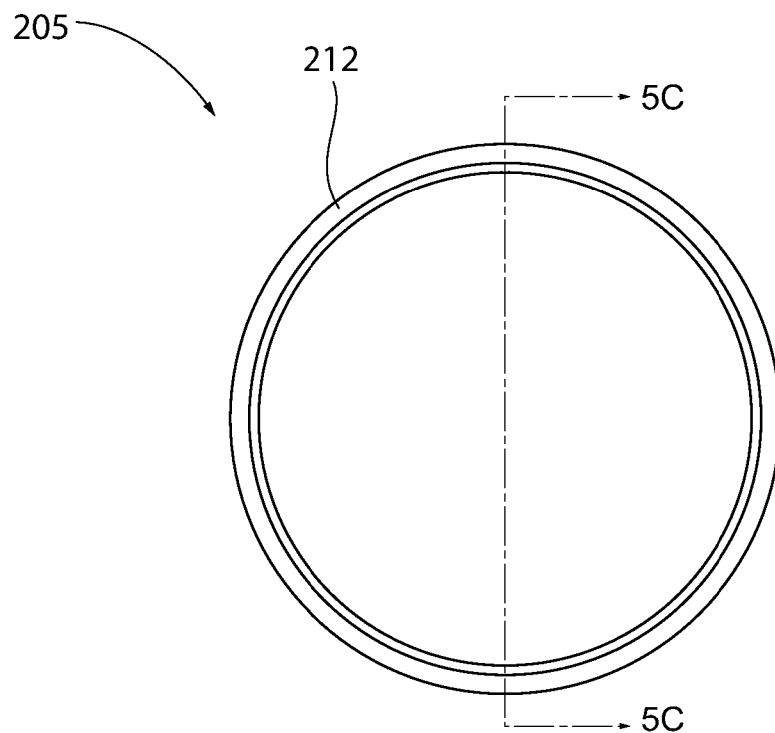
FIG. 5B is an end view of the plug housing of FIG. 5A in accordance with an embodiment of the present disclosure.

As shown in FIGS. 5A and 5B, the plug housing 205 can include at least one aperture 210 extending through a sidewall portion 212 thereof. The aperture 210 is configured to form a direct egress for the fluid and/or contaminates to drain through opening 21 of the main spring housing 20 and out of the main spring housing 20 and the slack adjuster 10 to reduce and/or to prevent the fluid and/or contaminants from entering into the critical operating area 70 of the slack adjuster. Multiple apertures 210 can be located about and extending through the sidewall portion 212 of the plug housing 205.

Figure 6A:
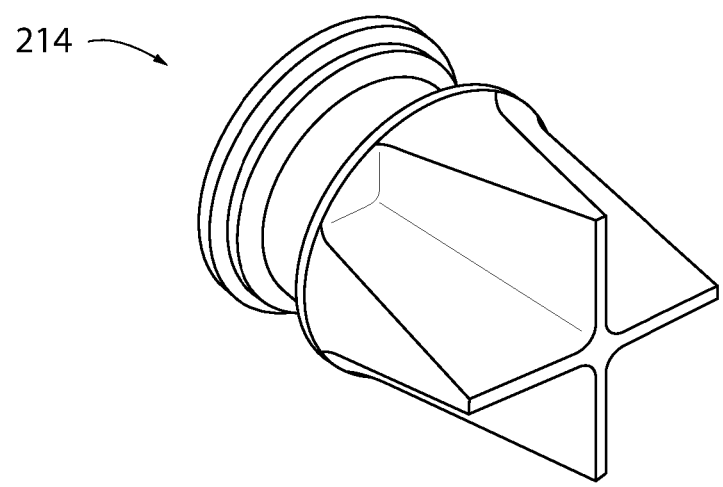
FIG. 6A is a bottom perspective view of a plug or a one-way valve that can be used in the drainage system in accordance with an embodiment of the present disclosure.
Figure 6B:
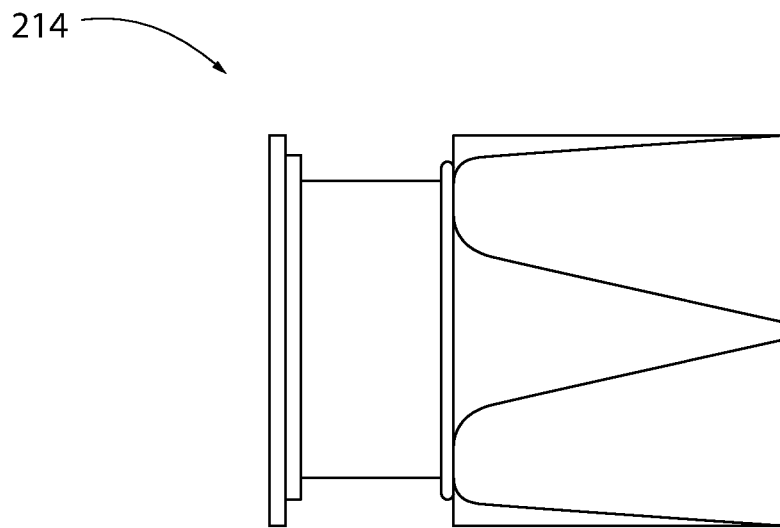
FIG. 6B is a side elevation view of the plug or one-way valve of FIG. 6A in accordance with an embodiment of the present disclosure.
Figure 6C:
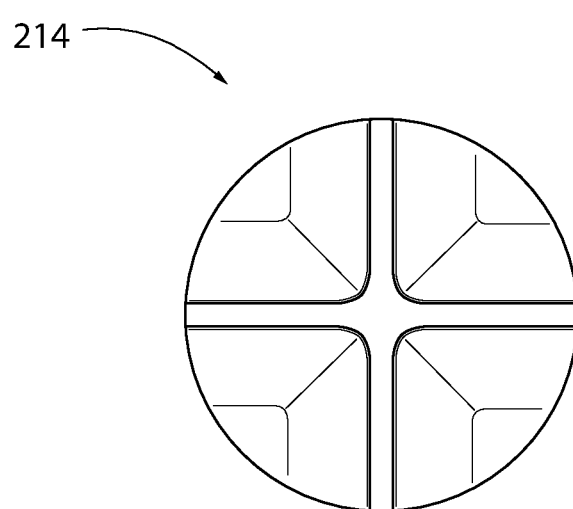
FIG. 6C is a bottom end view of the plug or one-way valve of FIG. 6A in accordance with an embodiment of the present disclosure.
Figure 7A:
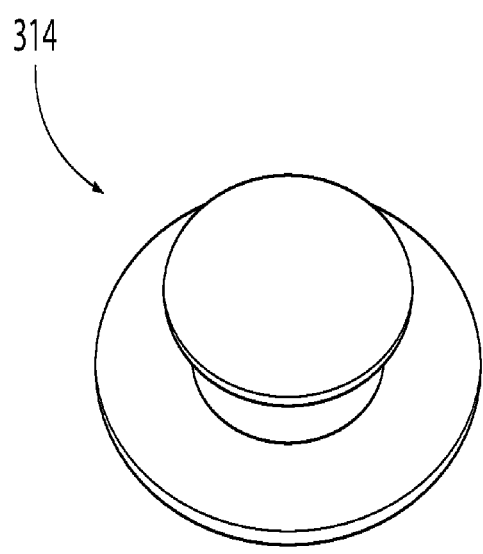
FIG. 7A is a bottom perspective view of a plug according to another embodiment that can be used in the drainage system in accordance with an embodiment of the present disclosure.
Figure 7B:
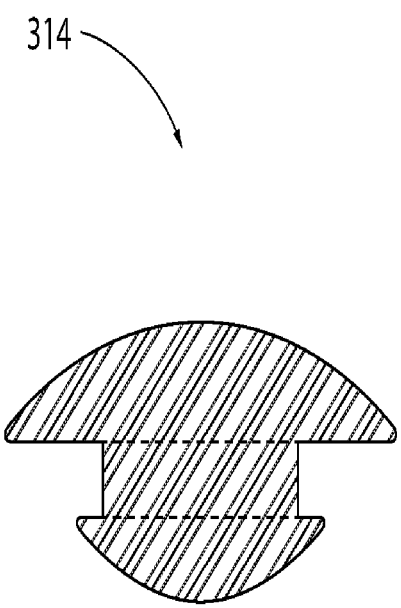
FIG. 7B is a cross-sectional side of the plug of FIG. 7A in accordance with an embodiment of the present disclosure.
Figure 8:
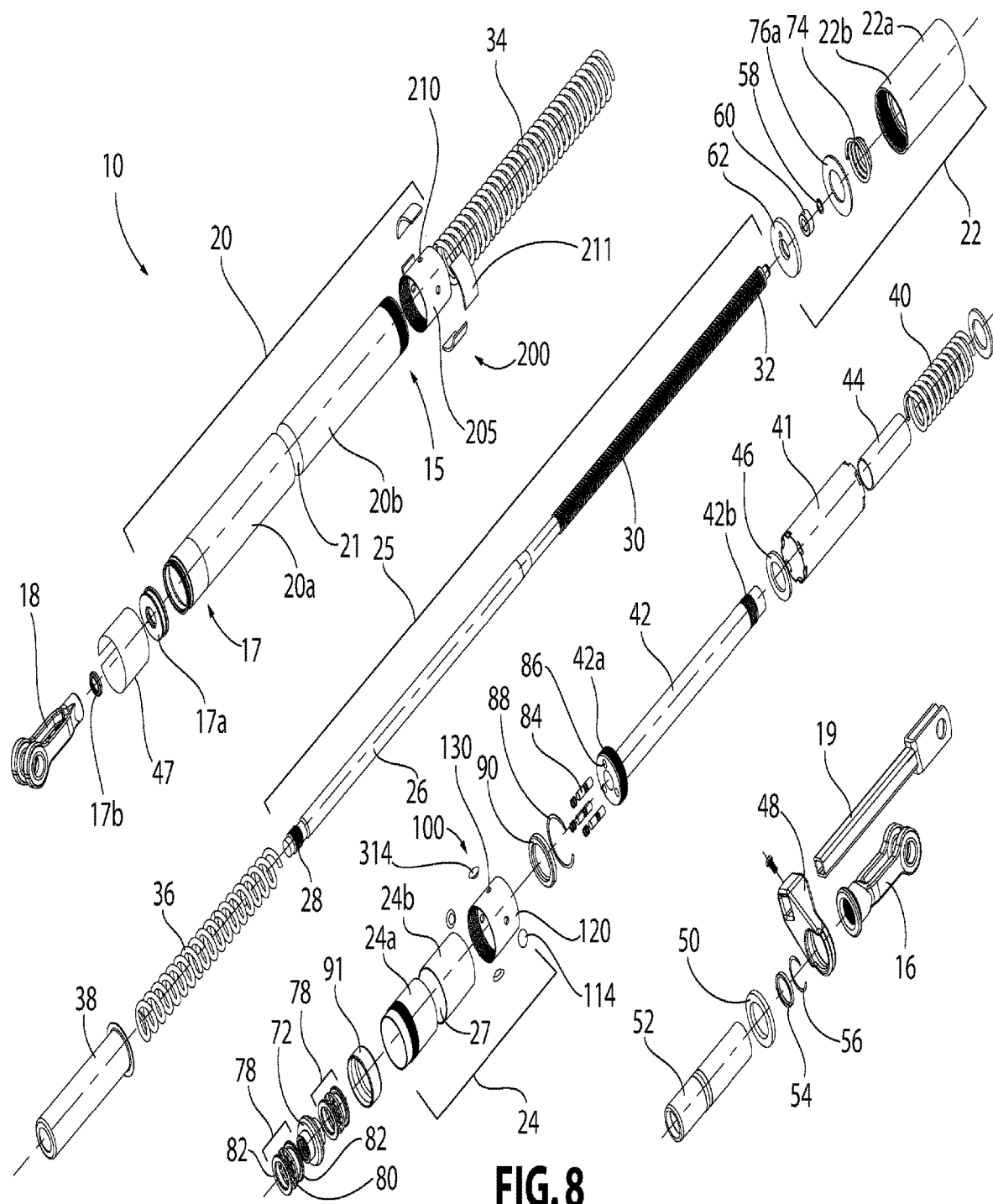
FIG. 8 is an expanded perspective view of the slack adjuster of FIG. 1, including the drainage system including a main spring housing seal/splash guard in accordance with another embodiment of the present disclosure.

A patch 211, as shown in FIGS. 1-3 and 4a, or a plug 214, as shown in detail in FIGS. 6A-6C, can be provided to cover the apertures 210. The plug 214 can be in the form of a one-way valve and each of the apertures 210 can include a plug or one-way valve therein. The use of a one-way valve allows for drainage from the drainage area and provides a means to prevent any contaminants from entering back through the drainage area. According to one embodiment, one or more of the patches 211 or plugs 214 can be removed, such as the patch 211 or plug 214 facing downward, after installation of the slack adjuster assembly in the brake rigging. This would allow for quicker, unrestricted drainage of the water and/or contaminants from the drainage area of the slack adjuster 10. According to a further embodiment, one or more of the apertures 210 can be filled with a sealant, such as an epoxy or any other known sealant material, which can be removed or "popped out" of the aperture 210 to enable drainage therethrough. According to yet another embodiment, the plug can be in the form of a rounded, low-profile button shaped plug, such as plug 314, shown in FIGS. 7A and 7B.

Figure 5C:
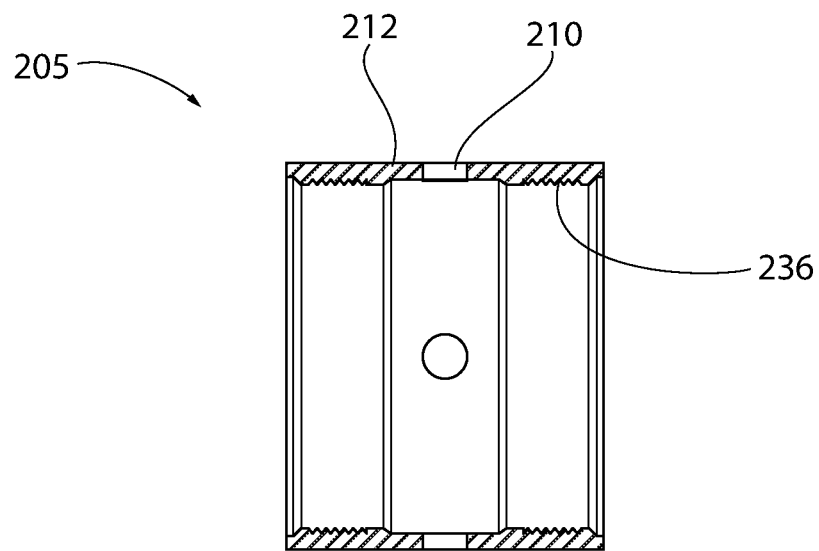
FIG. 5C is a cross-sectional view of the plug housing taken along line 5C-5C of FIG. 5B in accordance with an embodiment of the present disclosure.

According to one design, the plug housing, generally indicated as 205 in FIGS. 5A-5C includes at least one aperture 210, or a plurality of apertures 210, extending through a sidewall portion 212 in alignment with the opening 21 of the main spring housing 20. It can be appreciated that according to another embodiment, the main spring housing 20 can include openings in the form of apertures extending through a sidewall portion of the main spring housing 20 and the apertures 210 of the plug housing 205 are aligned with these openings in the main spring housing 20. As stated above, the plug housing 205 can include threads 236 for threadedly engaging threads 238 on the facing end portions of the main spring housing portions 20a, 20b, as shown in FIG. 4C. It can be appreciated that multiple patches 211, plugs or one-way valves 214, 314 can be provided about and extending through the sidewall of the main spring housing 20 and that all of the patches 211, plugs, or one-way valves 214, 314 can be removable. Using multiple removable patches or plugs 211, 214, 314 aids in the installation of the slack adjuster 10 in that depending upon the orientation of the plugs or one-way valves after installation, the bottom most or two bottom most patches, plugs, or one-way valves 211, 214, 314 can be removed.

With continuing reference to FIG. 3, in addition to the drainage system 200 described in detail above, the slack adjuster 10 can also include a second drainage system 100 associated with the over travel housing portion 24. The drainage system 100 includes at least one opening 27 extending through a sidewall portion of the over travel housing portion 24. According to one embodiment, the opening can be formed by providing two separate portions 24a, 24b of the over travel housing portion 24 and associating these portions 24a, 24b with one another via a second plug housing 120, as described below such that opening 27 extends there between. The opening 27 is configured to form a direct egress for the fluid and/or contaminates to drain therethrough and to reduce exposure of the critical operating area 70 to fluid and/or contaminants. According to another embodiment, the opening 27 can comprise one or more apertures formed through a sidewall portion of the over travel housing portion 24.

As discussed above, the second plug housing 120 can encompass at least a portion of the over travel housing portion 24. The second plug housing 120 includes at least one aperture 130, or a plurality of apertures 130, extending through a sidewall portion in alignment with the opening 27 or apertures extending through the over travel housing portion 24. The second plug housing 120 can threadedly engage the over travel housing portion 24. A removable plug 114, can be provided to close the aligned openings or apertures 27, 130. The plug 114 can be in the form of a one-way valve, a patch, or a sealant material as discussed in detail above. After installation, the downwardly most directed plug is removed to allow for drainage of fluid and contaminants out of the slack adjuster 10 and away from the critical operating area 70 of the slack adjuster 10.

Reference is now made to FIGS. 8, 9, and 9A-9C which show a double-acting slack adjuster, generally indicated as 10a, in accordance with another embodiment of the present disclosure. This embodiment is similar to the embodiment shown in FIG. 1, wherein like reference numerals are used to designate like components. The embodiment shown in FIGS. 8, 9, and 9A-9C differ from the FIG. 1 slack adjuster 10 in that the drainage system 200 includes a main spring housing seal/splash guard 76a. The main spring housing seal/splash guard 76a is positioned between the conical spring 74 located in the cone nut housing 22 and the washer 62 located at an end of the main spring housing 20. The main spring housing seal/splash guard 76a is configured to prevent the accumulation of contaminants near the critical operating area 70 of the slack adjuster 10a, as shown in detail in FIG. 9B, and provides a flexible guard against contaminant intrusion into this critical area 70. It can be appreciated that the main spring housing seal splash guard 76a can be used with a slack adjuster that does not include a drainage system 100 and/or 200.

Figure 10A:
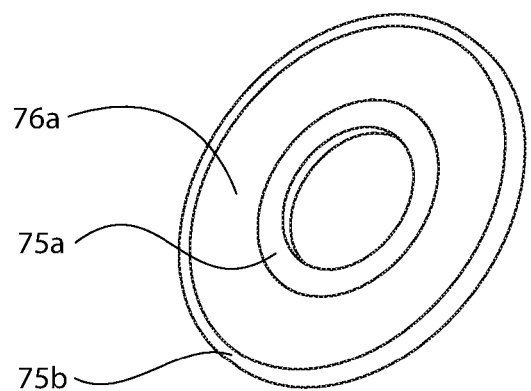
FIG. 10A is a perspective view of the main spring housing seal/splash guard of FIG. 8 that can be used in the drainage system in accordance with an embodiment of the present disclosure.
Figure 10B:
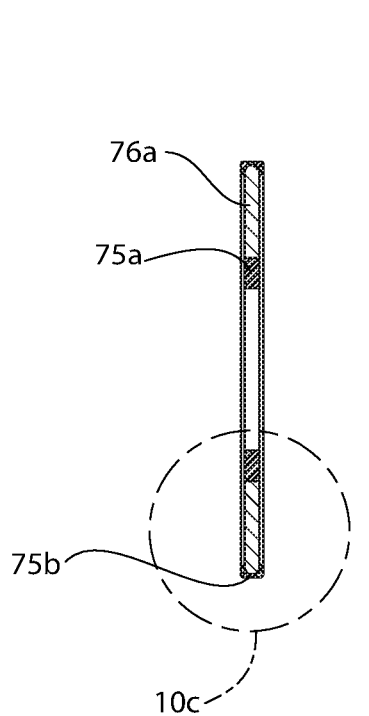
FIG. 10B is a cross-sectional side view of the main spring housing seal/splash guard of FIG. 10A in accordance with an embodiment of the present disclosure.
Figure 10C:
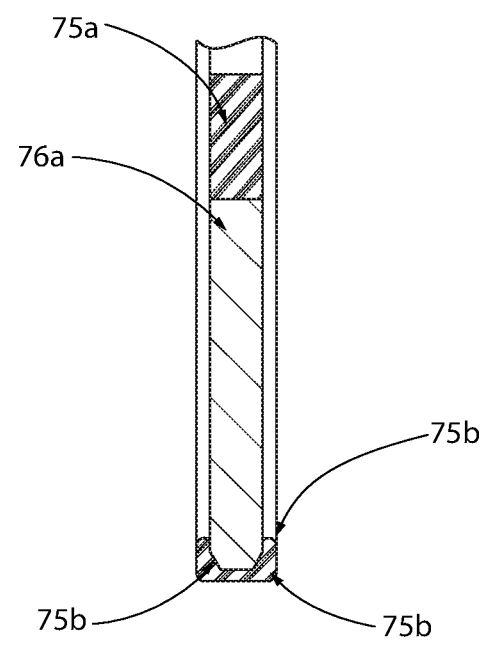
FIG. 10C is a detailed area view labeled "10c" in FIG. 10B in accordance with an embodiment of the present disclosure.

As illustrated in FIGS. 10A-10C, the main spring housing seal/splash guard 76a, according to one embodiment, can be a rubberized washer which acts as a spring seat for the conical spring 74 in the critical operating area 70. The rubberized washer can include a rubber material, such as nitrile, Viton, EPDM, and the like, which is associated with the inner portion 75a and outer portion 75b of the washer. It can be appreciated that the rubber material can be associated with the washer by any known technique, such as molded, vulcanized, glued, fastened, and the like. The rubberized inner portion 75a and outer portion 75b form sealing mechanisms on the washer 76a. Also, the rubberized portion on the washer inner portion 75a acts as a splash guard, as well as preventing the accumulation of materials, water, contaminants, etc. from moving from the main spring housing 20 into the cone nut housing 22 which contains the critical operating area 70 of the slack adjuster 10a.

During assembly of the main spring housing 20 with the cone nut housing 22, the mating surfaces of the housings compress the rubber of the main spring housing seal/splash guard 76a into any remaining open areas between the housings 20, 22, sealing the area from any water intrusion from either the threads or from contaminants going over or under outer diameter 75b of the seal/splash guard 76a. The rubber material located on the inner diameter 75a of the seal/splash guard 76a acts as a guard against splashing or rolling water from entering through the central opening of the washer. The rubber material on the inner diameter 75a can be configured according to several embodiments. According to one embodiment, the material can simply make contact with the threaded rod. According to another embodiment, the rubber material can be threaded to interlock with the rod. According to yet another embodiment, the rubber material can be oversized to act as a mitigator of contaminants rather than a full sealing system.

The above description is illustrative and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein define the parameters of the inventive subject matter, they are by no means limiting and are example embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled.

This written description uses examples to disclose several embodiments of the inventive subject matter and also to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are within the scope of the claims if they have structural elements that do not differ from the literal language of the claims, or if they include equivalent structural elements with insubstantial differences from the literal languages of the claims.

The foregoing description of certain embodiments of the inventive subject matter will be understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A brake slack adjuster comprising:
   a housing assembly having an elongated rod configured to operate to adjust a brake, the housing assembly comprising a main spring housing having at least one drain opening;
   a guard coupled with the housing assembly and having an inner opening that is one or more of in sealing contact with or interlocked with the elongated rod in the housing assembly; and
   a plug housing configured to encompass at least a portion of the housing assembly, the plug housing including at least one aperture in alignment with the at least one drain opening in the main spring housing of the housing assembly.

2. The brake slack adjuster of claim 1, wherein the at least one opening positioned to allow one or more of fluid or a contaminant to drain from an interior of the housing assembly.

3. The brake slack adjuster of claim 1, wherein the housing assembly includes plural main spring housing members with the plug housing interconnecting two or more of the main plural spring housing members with each other.

4. The brake slack adjuster of claim 1, wherein the housing assembly includes the main spring housing and a cone nut housing, and the guard includes a washer having the inner opening.

5. A brake slack adjuster comprising:
   a housing assembly;
   a spring and an elongated rod disposed in the housing assembly and configured to operate to adjust a brake;
   at least one opening extending through the housing assembly, the at least one opening configured to allow one or more of fluid or contaminants to drain out from the housing assembly; and
   a guard disposed in the housing assembly, wherein the guard is in sealing contact with and interlocks with the elongated rod to prevent the one or more of the fluid or the contaminants from passing the guard.

6. The brake slack adjuster of claim 5, wherein the guard is a spring seat for the spring.

7. The brake slack adjuster of claim 5, wherein the guard includes a washer having a central opening that one or more of comes into sealing contact with or interlocks with the elongated rod, wherein the central opening is defined by an inner portion, wherein at least the inner portion of the guard is rubberized.

8. The brake slack adjuster of claim 5, wherein the spring is a conical spring.

9. The brake slack adjuster of claim 8, further comprising a plug housing configured to encompass at least a portion of the housing assembly.

10. The brake slack adjuster of claim 9, wherein the plug housing includes at least one aperture in alignment with the at least one opening extending through the housing assembly.

11. The brake slack adjuster of claim 9, wherein the housing assembly includes first and second housing members interconnected with each other by the plug housing.

12. The brake slack adjuster of claim 5, wherein the housing assembly includes a cone nut housing in which the spring is disposed.

13. A brake apparatus comprising:
   a housing assembly formed of plural portions and having an elongated rod operable to adjust a vehicle brake disposed within the housing assembly; and
   a guard compressed between mating surfaces of the portions of the housing assembly, the guard configured to prevent entry of one or more of fluid or contaminants from entering into the housing assembly and contacting the elongated rod in the housing assembly, the guard having a central opening through which the elongated rod extends, wherein the elongated rod is configured to interlock with a portion of the central opening.

14. The brake apparatus of claim 13, wherein the housing assembly includes openings, and further comprising:
   one or more of plugs or patches removably disposed in the openings in the housing assembly and sealing the openings in the housing assembly.

15. The brake apparatus of claim 14, wherein the one or more of the plugs or the patches are configured to be removed after installation of the brake apparatus in a vehicle.

16. The brake apparatus of claim 13, wherein the portions of the housing assembly include a spring housing and a plug housing, the spring housing having first and second members.

17. The brake apparatus of claim 16, wherein the plug housing includes plural drain openings.

18. The brake apparatus of claim 16, wherein the plug housing has threads for engaging the first member of the spring housing at a first end of the plug housing and for engaging the second member of the spring housing at a second end of the plug housing such that the first and second members are interconnected with the plug housing therebetween.

19. The brake apparatus of claim 18, wherein the plug housing includes the plural openings.

20. The brake apparatus of claim 18, wherein the elongated rod is configured to adjust slack of a brake system.

* * * * *